US012444374B2

(12) United States Patent
Pyo

(10) Patent No.: US 12,444,374 B2
(45) Date of Patent: Oct. 14, 2025

(54) METHOD AND SYSTEM FOR SETTING BLACK VOLTAGE OF DISPLAY PANEL

(71) Applicant: Samsung Display Co., Ltd., Yongin-Si (KR)

(72) Inventor: Sibeak Pyo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/755,676

(22) Filed: Jun. 27, 2024

(65) Prior Publication Data

US 2025/0239229 A1 Jul. 24, 2025

(30) Foreign Application Priority Data

Jan. 24, 2024 (KR) ........................ 10-2024-0011182

(51) Int. Cl.
*G09G 3/3291* (2016.01)

(52) U.S. Cl.
CPC ... *G09G 3/3291* (2013.01); *G09G 2320/0238* (2013.01)

(58) Field of Classification Search
CPC .............................................. G09G 2320/0238
See application file for complete search history.

(56) References Cited

U.S. PATENT DOCUMENTS 7,605,785 B2 * 10/2009 Stoops ................... H04N 9/312 345/87
10,997,909 B2 * 5/2021 Pyo ...................... G09G 3/3233
11,017,727 B2 * 5/2021 Pyo ...................... G09G 3/3291
11,222,576 B2 * 1/2022 Pyun ........................ G09G 3/20
2009/0052774 A1 * 2/2009 Yoshii ....................... G06T 5/40 382/167
2011/0234645 A1 * 9/2011 Jyou ...................... G09G 3/002 345/690
2015/0161935 A1 * 6/2015 Giannikouris ....... G09G 3/2074 345/694
2016/0275842 A1 * 9/2016 Seok .................... G09G 3/3233
2017/0076695 A1 * 3/2017 Hwang ................ G09G 3/3291
2019/0130827 A1 * 5/2019 Pyo ...................... G09G 3/3233
2020/0143733 A1 * 5/2020 Kim ..................... G09G 3/2018
2021/0343247 A1 * 11/2021 Pyo ...................... H10K 59/352
2023/0079286 A1 * 3/2023 Wang .................. G09G 3/3225 345/690
2024/0029646 A1 * 1/2024 Kim ..................... G09G 3/3208

FOREIGN PATENT DOCUMENTS

KR 10-1889784 B1 8/2018
KR 10-2021-0060691 A 5/2021
KR 10-2485164 B1 1/2023

* cited by examiner

*Primary Examiner* — Sepehr Azari
(74) *Attorney, Agent, or Firm* — Innovation Counsel LLP

(57) ABSTRACT

A method and system for setting a black voltage of a display panel is provided to reduce power consumption through setting the black voltage considering a color area. The method of setting the black voltage of the display panel comprising a first pixel of a first color, a second pixel of a second color, and a third pixel of a third color comprises applying a test voltage to the display panel, measuring a luminance and color area of a test image displayed in the display panel, and individually obtaining a black voltage of each of the first to third pixels based on the luminance and the color area.

18 Claims, 12 Drawing Sheets

| INDIVIDUAL SETTING OF BLACK VOLTAGE | | COMPARATIVE EXAMPLE | | | EXPERIMENT EXAMPLE | | | REDUCTION LEVEL |
|---|---|---|---|---|---|---|---|---|
| | | R, G, B COMMON BLACK VOLTAGE | | | R, G, B LUMINANCE EQUALIZED | | | |
| | | DERIVED BLACK VOLTAGE | CONTRIBUTING LUMINANCE (nit) | BLACK VOLTAGE +MARGIN VALUE (0.3V) | DERIVED BLACK VOLTAGE | CONTRIBUTING LUMINANCE | BLACK VOLTAGE +MARGIN VALUE (0.3V) | |
| BLACK VOLTAGE | R_Black | 5.8V | 0.0008 | 6.1V | 5.9V | 0.0003 | 6.2V | - |
| | G_Black | 5.8V | 0.0001 | 6.1V | 5.5V | 0.0004 | 5.8V | - |
| | B_Black | 5.8V | 0.0001 | 6.1V | 4.7V | 0.0003 | 5.0V | - |
| | AVERAGE BLACK VOLTAGE | - | - | 6.10V | - | - | 5.67V | -0.43 |
| SOURCE VOLTAGE | R_VLIN1 | - | - | 6.6V | - | - | 6.7V | - |
| | G_VLIN1 | - | - | 6.6V | - | - | 6.3V | - |
| | B_VLIN1 | - | - | 6.6V | - | - | 5.5V | - |
| | AVERAGE SOURCE VOLTAGE | - | - | 6.60V | - | - | 6.17V | -0.43 |

FIG. 11

| INDIVIDUAL SETTING OF BLACK VOLTAGE | | COMPARATIVE EXAMPLE | | | EXPERIMENT EXAMPLE | | | REDUCTION LEVEL |
|---|---|---|---|---|---|---|---|---|
| | | R, G, B COMMON BLACK VOLTAGE | | | R, G, B LUMINANCE EQUALIZED | | | |
| | | DERIVED BLACK VOLTAGE | CONTRIBUTING LUMINANCE (nit) | BLACK VOLTAGE +MARGIN VALUE (0.3V) | DERIVED BLACK VOLTAGE | CONTRIBUTING LUMINANCE | BLACK VOLTAGE +MARGIN VALUE (0.3V) | |
| BLACK VOLTAGE | R_Black | 5.8V | 0.0008 | 6.1V | 5.9V | 0.0003 | 6.2V | – |
| | G_Black | 5.8V | 0.0001 | 6.1V | 5.5V | 0.0004 | 5.8V | – |
| | B_Black | 5.8V | 0.0001 | 6.1V | 4.7V | 0.0003 | 5.0V | – |
| | AVERAGE BLACK VOLTAGE | – | – | 6.10V | – | – | 5.67V | −0.43 |
| SOURCE VOLTAGE | R_VLIN1 | – | – | 6.6V | – | – | 6.7V | – |
| | G_VLIN1 | – | – | 6.6V | – | – | 6.3V | – |
| | B_VLIN1 | – | – | 6.6V | – | – | 5.5V | – |
| | AVERAGE SOURCE VOLTAGE | – | – | 6.60V | – | – | 6.17V | −0.43 |

METHOD AND SYSTEM FOR SETTING BLACK VOLTAGE OF DISPLAY PANEL

CROSS-REFERENCE TO RELATED APPLICATION

This application is claims priority under 35 U.S.C. § 119 to Korean Patent Application No. 10-2024-0011182, filed on Jan. 24, 2024, in the Korean Intellectual Property Office, the disclosure of which is incorporated by reference herein in its entirety.

BACKGROUND

1. Field

The present disclosure relates to a method and system for setting a black voltage of a display panel to reduce power consumption by setting the black voltage considering a color area.

2. Description of the Related Art

A display device is an apparatus displaying images by receiving information about the images. The display device may be used as a display unit for a small product such as a mobile phone or as a display unit for a large product such as a television.

The display device includes a plurality of pixels that receives an electrical signal and emit light in order to display an image externally. Each pixel may include an emission element. For example, an organic light-emitting display device may include an organic light-emitting diode (OLED) as the emission element. Generally, the organic light-emitting display device may include a thin-film transistor and the organic light-emitting diode (OLED) disposed on a substrate, and the organic light-emitting diode emits light by themselves to operate.

SUMMARY

The present disclosure may include a method and system for setting a black voltage of a display panel to reduce power consumption by setting the black voltage considering a color area. However, this feature is only an example, and the scope of the disclosure is not limited thereto.

Additional aspects will be set forth in the description which follows and will be apparent from the description.

According to an embodiment, a method of setting a black voltage of a display panel comprising a first pixel of a first color, a second pixel of a second color, and a third pixel of a third color comprises applying a test voltage to the display panel, measuring a luminance and color area of a test image displayed in the display panel, and individually obtaining a black voltage of each of the first to third pixels based on the luminance and the color area.

According to an embodiment, the measuring of the luminance and the color area of the test image may include, when the luminance exceeds a preset reference luminance, measuring a color area of the display panel.

According to an embodiment, the test voltage may be greater than a reference voltage for the display panel to have the reference luminance.

According to an embodiment, the individually obtaining the black voltage may include obtaining main color information of the test image from the color area.

According to an embodiment, the individually obtaining the black voltage may further include obtaining information about at least one pixel corresponding to the main color information among the first to third pixels.

According to an embodiment, the individually obtaining the black voltage may further include applying the test voltage to the at least one pixel, and remeasuring the luminance of the display panel while changing the test voltage.

According to an embodiment, the individually obtaining the black voltage may further include, when the remeasured luminance is less than or equal to the preset reference luminance, obtaining the black voltage of the at least one pixel based on the changed test voltage.

According to an embodiment, the main color information may be derived from the color area based an equation:

$$\text{Min. }\{duv(A\text{-Red}), duv(A\text{-Green}), duv(A\text{-Blue}), duv(A\text{-Cyan}), duv(A\text{-Magenta}), duv(A\text{-Yellow}), duv(A\text{-White})\}, A,$$

where A is a color coordinate measured by a measurement device at a point A, duv(A-Red) is a distance between the color coordinate of point A and a color coordinate corresponding to red color, duv(A-Green) is a distance between the color coordinate of point A and a color coordinate corresponding to green color, duv(A-Blue) is a distance between the color coordinate of point A and a color coordinate corresponding to blue color, duv(A-Cyan) is a distance between the color coordinate of point A and a color coordinate corresponding to cyan color, duv(A-Magenta) is a distance between the color coordinate of point A and a color coordinate corresponding to magenta color, duv(A-Yellow) is a distance between the color coordinate of point A and a color coordinate corresponding to yellow color, duv(A-White) is a distance between the color coordinate of point A and a color coordinate corresponding to white color, and Min. refers to a minimum value.

According to an embodiment, the individually obtaining the black voltage may include applying the test voltage to the first pixel when the main color information is the first color, applying the test voltage to the first pixel when the main color information is the first color, and, when the remeasured luminance is less than or equal to the preset reference luminance, obtaining a first black voltage of the first pixel based on the changed test voltage.

According to an embodiment, the individually obtaining the black voltage may include applying the test voltage to the first pixel and the second pixel when the main color information is a first mixed color in which the first color and the second color are mixed, remeasuring the luminance of the display panel while changing the test voltage, and, when the remeasured luminance is less than or equal to the preset reference luminance, obtaining a first black voltage of the first pixel and a second black voltage of the second pixel based on the changed test voltage.

According to an embodiment, a system for setting a black voltage of a display panel may include a display panel including a first pixel of a first color, a second pixel of a second color, and a third pixel of a third color, a driving circuit connected to the display panel and supplying a test voltage to the display panel, a measurement device disposed on the display panel and measuring a luminance and a color area of a test image displayed in the display panel, and a computing device connected to the driving circuit and the measurement device and controlling the measurement device and the driving circuit and individually obtaining a black voltage of each of the first to third pixel pixels based on the luminance and the color area.

According to an embodiment, the computing device may, when the luminance exceeds a preset reference luminance, further control the measurement device to measure the color area of the display panel.

According to an embodiment, the test voltage may be greater than a reference voltage for the display panel to have the reference luminance.

According to an embodiment, the computing device may further obtain main color information of the test image from the color area.

According to an embodiment, the computing device may further obtain information about at least one pixel corresponding to the main color information among the first to third pixels.

According to an embodiment, the computing device may further apply the test voltage to the at least one pixel and remeasure the luminance of the display panel while changing the test voltage.

According to an embodiment, the computing device may, when the remeasured luminance is less than or equal to the preset reference luminance, further obtain the black voltage of the at least one pixel based on the changed test voltage.

According to an embodiment, the main color information may be derived from the color area based on an equation:

$$\text{Min. }\{duv(A\text{-}Red), duv(A\text{-}Green), duv(A\text{-}Blue), duv(A\text{-}Cyan), duv(A\text{-}Magenta), duv(A\text{-}Yellow), duv(A\text{-}White)\}, A,$$

where A is a color coordinate measured by the measurement device at a point A, duv(A-Red) is a distance between the color coordinate of point A and a color coordinate corresponding to red color, duv(A-Green) is a distance between the color coordinate of point A and a color coordinate corresponding to green color, duv(A-Blue) is a distance between the color coordinate of point A and a color coordinate corresponding to blue color, duv(A-Cyan) is a distance between the color coordinate of point A and a color coordinate corresponding to cyan color, duv(A-Magenta) is a distance between the color coordinate of point A and a color coordinate corresponding to magenta color, duv(A-Yellow) is a distance between the color coordinate of point A and a color coordinate corresponding to yellow color, duv(A-White) is a distance between the color coordinate of point A and a color coordinate corresponding to white color, Min. refers to a minimum value.

According to an embodiment, the computing device may, when the main color information is the first color, further apply the test voltage to the first pixel and remeasure the luminance of the display panel while changing the test voltage, and when the remeasured luminance is less than or equal to the preset reference luminance, obtain a first black voltage of the first pixel based on the changed test voltage.

According to an embodiment, the computing device may, when the main color information is a first mixed color in which the first color and the second color are mixed, further apply the test voltage to the first pixel and the second pixel and remeasure the luminance of the display panel while changing the test voltage, and when the remeasured luminance is less than or equal to the preset reference luminance, obtain a first black voltage of the first pixel and a second black voltage of the second pixel based on the changed test voltage.

BRIEF DESCRIPTION OF THE DRAWINGS

The above and other aspects, features, and advantages of the present disclosure will become more apparent by reference to the following description taken in conjunction with the accompanying drawings wherein:

FIG. 11 is a table comparing a comparative example and an experiment example to demonstrate an effect according to the disclosure.

DETAILED DESCRIPTION

Figure 1:
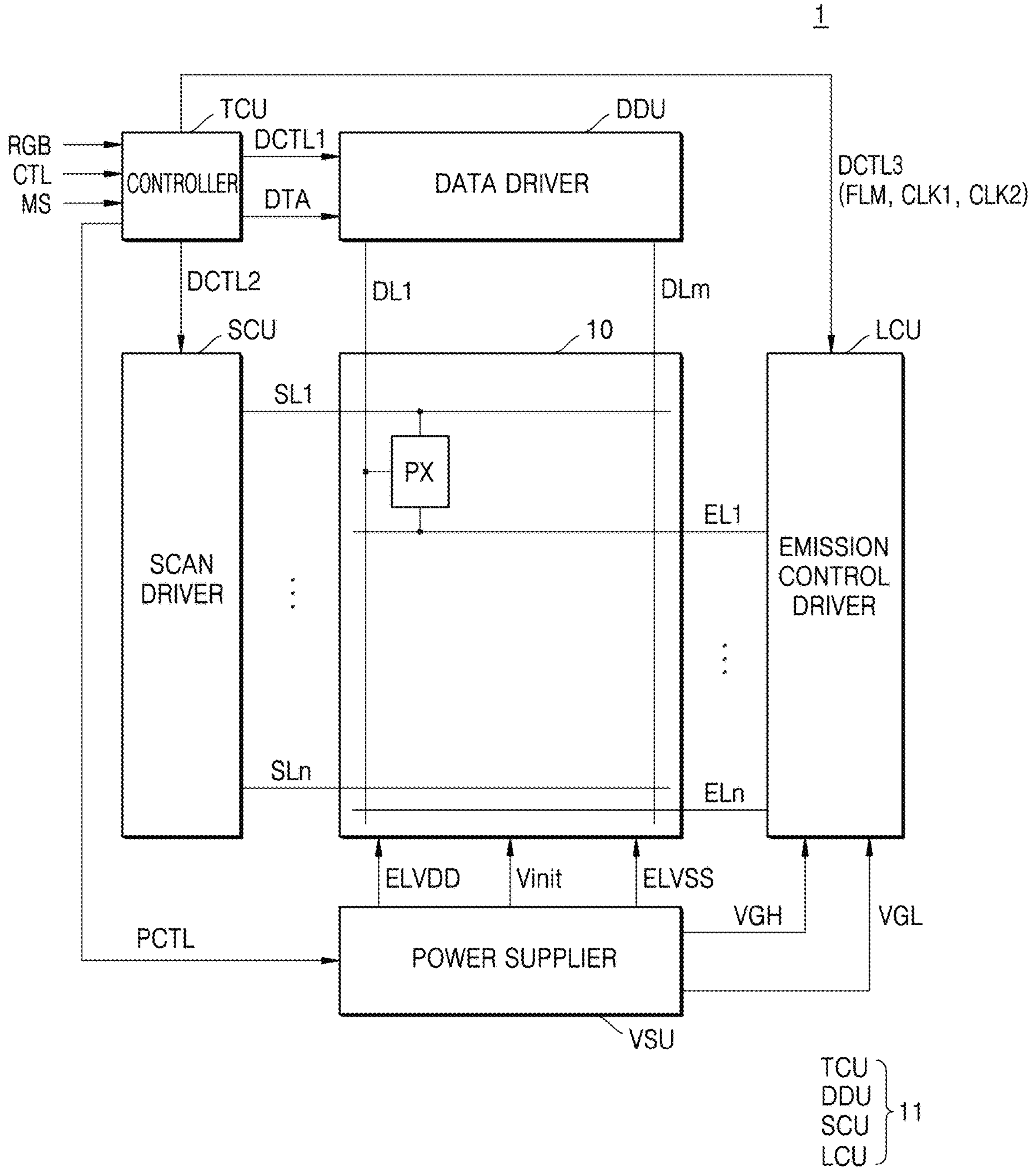
FIG. 1 is a block diagram illustrating a configuration of a display device.

Hereinafter, specific embodiments of the present disclosure are explained in detail with reference to the accompanying drawings. Like numerals refer to like elements throughout. In this regard, embodiments of the present disclosure may have different forms and should not be construed as being limited to the descriptions set forth herein. Accordingly, the embodiments are merely described below, by referring to the drawing, to explain aspects of the present disclosure. As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

As the present disclosure allows for various changes and can have numerous embodiments, specific embodiments will be illustrated in the drawings and described in the detailed description. The effects and features of the present disclosure, as well as the methods for achieving them will become clear with reference to the detailed embodiments described below provided with the drawings. However, it should be noted that the present disclosure is not limited to the following embodiments and may be implemented in various forms.

Hereinafter, embodiments will be described in detail with reference to the accompanying drawings, wherein the same or corresponding elements are denoted by the same reference numerals throughout and a repeated description thereof is omitted.

It will be understood that when an element, such as a layer, a film, a region, or a plate, is referred to as being "on" another element, the element can be directly on the other element or intervening elements may be present thereon. In addition, it will be understood that when an element, such as a layer, a film, a region, or a plate, is referred to as being "under" another element, the element can be directly under the other element or intervening elements may be present thereunder.

Sizes of elements in the drawings may be exaggerated or reduced for convenience of description. For example, because sizes and thicknesses of elements in the drawings are arbitrarily illustrated for convenience of explanation, the disclosure is not limited thereto. In other words, for convenience of description, the size, thickness, and ratio of the components illustrated in the drawings may be exaggerated and/or simplified. Therefore, spatially relative terms such as "below", "under", "lower", "above", "upper," may be terms used in the disclosure to easily describe the relation of an element or characteristic.

The terms used to explain space, directions, etc., herein may be understood as terms for describing the spatial orientation and direction shown in the drawing. However, they may also be understood as terms for explaining various other directions or aspects. For example, when a device or element shown in the drawing is inverted, the device or element described as "below" another element may be interpreted as arranged in a different direction (e.g., a direction rotated by 90 degrees or in the opposite direction, etc.). For example, when a device or element shown in the drawing is inverted, the device or element described as "above" another element may be interpreted as arranged in a different direction (e.g., a direction rotated by 90 degrees or in the opposite direction, etc.). In other words, "below" and "above" may include both upward and downward directions. In addition, the device or element may be aligned differently from the drawings, and the description according to the space or direction described herein may be interpreted in various ways.

The order of the process or method understood in the description of the processing process, manufacturing method, etc. may be different from the described order. For example, consecutively described two processes or methods may be performed at the same time or substantially at the same time or may be performed in an order opposite to the described order.

In the following embodiments, the x-axis, the y-axis, and the z-axis are not limited to three axes of the rectangular coordinate system and may be interpreted in a broader sense. For example, the x-axis, the y-axis, and the z-axis may be perpendicular to one another, or may represent different directions that are not perpendicular to one another.

The terms such as "first," "second," and "third" etc. may be used to explain specific elements of the present disclosure, and the terms, "first," "second," and "third" may be used to distinguish one element from other elements.

When an element is referred to as being "connected to" or "coupled to" other elements, the element may be directly or indirectly connected or coupled to other elements.

Similarly, when an element is "electrically connected" with other elements, the element may be directly or electrically connected to other elements or may be indirectly and electrically connected to other elements through a conductive element.

In addition, if an element is referred to as being "between two elements," the element may be understood as the only element disposed between the two elements or a different element than the element may be disposed between the two elements.

The terms used herein are used to explain a particular embodiment and are not intended to limit the disclosure. The singular "a" and "an" used herein are intended to include plural forms unless expressed otherwise in context.

For example, expressions such as "mixture," "composite," "mix," "include," etc., may indicate the presence of the specified features, integers, steps, operations, elements or components, but do not exclude the presence or addition of one or more other features, integers, steps, operations, elements, components, or groups.

For example, "substantially," "approximately," and other similar expressions may be used as approximate terms rather than precise one and may describe inherent variations in measured or calculated values that would be recognized by those of ordinary skill in the art. For example, terms such as "may" or "may be" may denote "one or more embodiments disclosed herein".

For example, in the specification, having an "identical layer structure" with another layer may mean that a plurality of layers included in a layer may be included in the same order in another layer. For example, a plurality of layers included in a layer and a plurality of layers included in another layer may include the same material and may be formed in the same order.

The electronic or electric devices or any other related devices or components (e.g. some of various modules) according to embodiments may be implemented by using suitable hardware, firmware (e.g., an application-specific integrated circuit), software, or a combination thereof. For example, various components of the devices may be formed on an integrated circuit (IC) chip or on a separate IC chip. In addition, various components of the above devices may be formed on a flexible printed circuit film, a tape carrier package (TCP), a printed circuit board (PCB), or a substrate. In addition, various components of the above devices may be a process or thread, may be executed in one or more processors, may execute computer program instructions in one or more computing devices, and may interact with other system components to perform various functions described in the disclosure.

Computer program instructions are stored in a memory that may be implemented in a computing device by using standard memory devices such as random access memory (RAM). Computer program instructions may also be stored in other non-transitory computer-readable recording medium, such as CD-ROM and flash drives. In addition, those of ordinary skill in the art may understand that functions of various computing devices may be combined or integrated into a single computing device or a function of a certain computing device may be distributed over one or more other computing devices while not deviating from the spirit and scope of the embodiment.

FIG. 1 is a block diagram illustrating an example of a configuration of a display device 1.

As shown in FIG. 1, a display device 1 may include a display panel 10, a data driver DDU, a scan driver SCU, an emission control driver LCU, a power supplier VSU (e.g., a power supply), and a controller TCU (e.g., a timing controller). The data driver DDU, the scan driver SCU, the emission control driver LCU, the power supplier VSU, and the controller TCU may be implemented as one chip or separate chips, and may be connected to the display panel as a chip on flexible printed circuit COF, chip on glass COG, or a flexible printed circuit FPC form.

A driving circuit 11 includes the data driver DDU, the scan driver SCU, the emission control driver LCU, and the controller TCU, and may be implemented as one chip or separate chips.

The display panel 10 may be connected to the scan driver SCU through a plurality of scan lines SL1 to SLn (n is a natural number of 2 or more), may be connected to the data driver DDU through a plurality of data lines DL1 to DLm (m is a natural number of 2 or more), and may be connected to the emission control driver LCU through a plurality of emission control lines EL1 to ELn. The display panel 10 may include a plurality of subpixels arranged in every cross section of the plurality of scan lines SL1 to SLn, the plurality of data lines DL1 to DLm, and the plurality of emission control lines EL1 to Eln.

The display panel 10 receives a high power supply voltage ELVDD and a low power supply voltage ELVSS from the power supplier VSU. In addition, the emission control driver LCU may receive a first voltage VGH and a second voltage VGL from the power supplier VSU. The scan driver SCU may provide a scan signal to each of the plurality of pixels through the plurality of scan lines SL1 to SLn based on a second driving control signal DCTL2.

The data driver DDU may provide a data voltage to each of the plurality of subpixels through the plurality of data lines DL1 to DLm based on a first driving control signal DCTL1. The data driver DDU may provide a data voltage to each of the plurality of pixels based on a display data DTA.

The emission control driver LCU may provide an emission control signal to each of the plurality of subpixels through the plurality of emission control lines EL1 to Eln based on a third driving control signal DCTL3. Based on the emission control signal, the luminance of the display panel 10 may be controlled.

The power supplier VSU may provide a high power supply voltage ELVDD, a low power supply voltage ELVSS, and an initialization voltage Vinit to the display panel 10 based on a power control signal PCTL and provide the first voltage VGH and the second voltage VGL of switching transistors, which involve in the driving of the pixel, to the emission control driver LCU. In addition, the power supplier VSU may generate a source voltage that produces the first voltage VGH, the second voltage VGL, and the initialization voltage Vinit.

The controller TCU may receive an input image data RGB, a control signal CLTL, and a mode signal MS and may generate the first to third driving control signals DCTL1 to DCTL3 based on the control signal CTL and the mode signal MS.

The controller TCU may provide the first driving control signal DCTL1 to the data driver DDU, the second driving control signal DCTL2 to the scan driver SCU, and the third driving control signal DCTL3 to the emission control driver LCU. The third driving control signal DCTL3 may include a frame line mark FLM, a first clock signal CLK1, and a second clock signal CLK2. The controller TCU may generate display data DTA representing a normal mode or a dimming mode based on the mode signal MS and input image data RGB.

Hereinafter, a black voltage setting system of a display device 10 according to an embodiment is described in detail based on the descriptions above.

Figure 2:
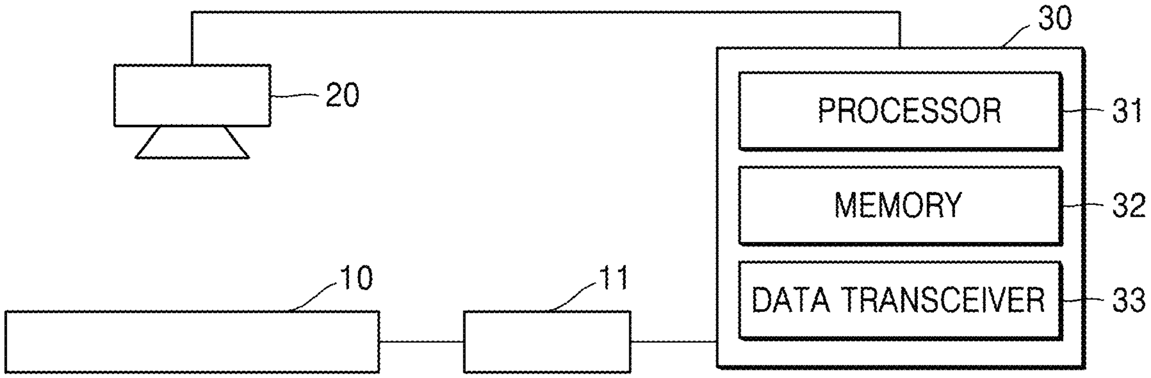
FIG. 2 is a schematic diagram of a black voltage setting system of a display panel, according to an embodiment.
Figure 3:
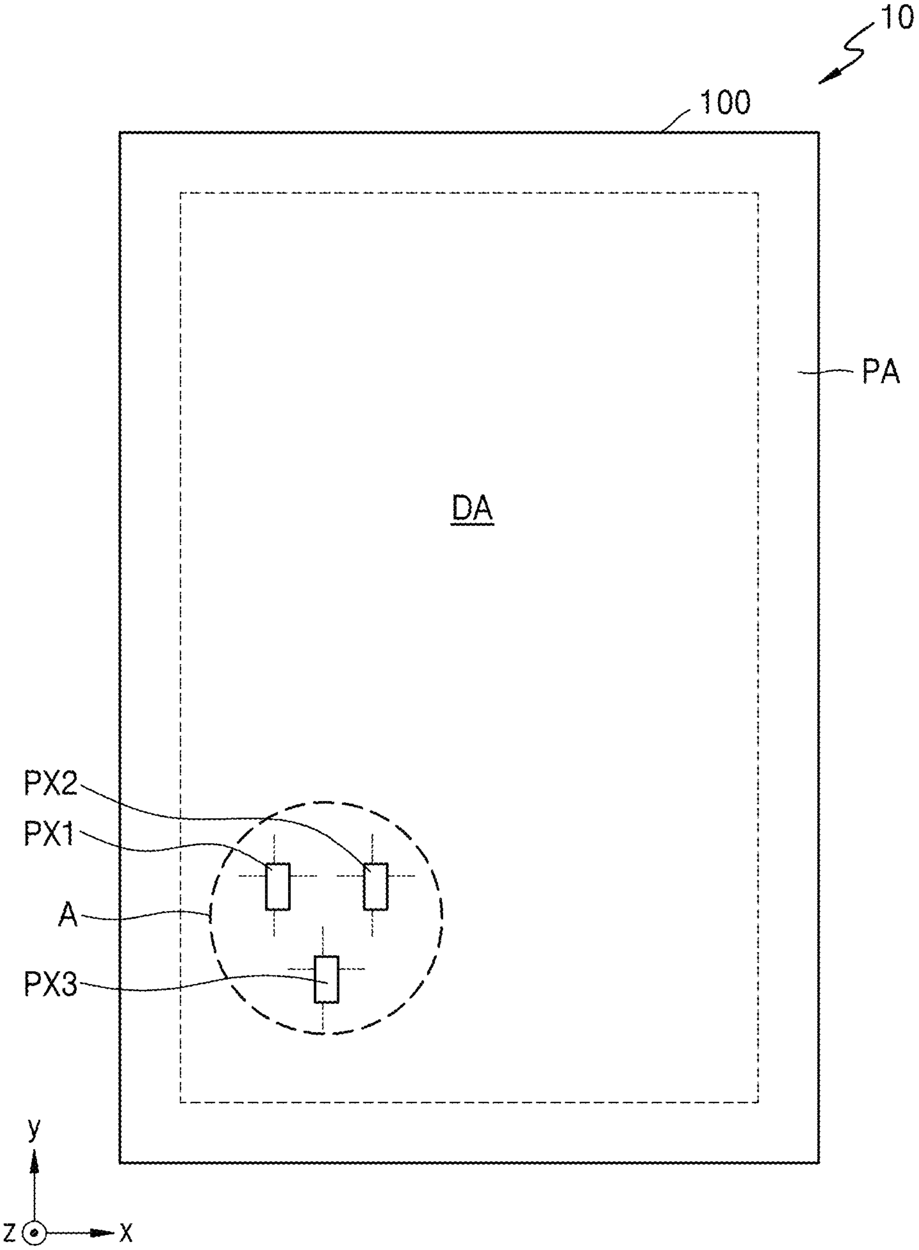
FIG. 3 is a schematic plan view of the display panel of FIG. 2.

FIG. 2 is a schematic diagram of a black voltage setting system of a display panel according to an embodiment and FIG. 3 is a schematic plan view of the display panel of FIG. 2. For reference, the same or duplicate descriptions mentioned above may be omitted.

As shown in FIG. 2, the black voltage setting system of the display panel 10 (hereinafter, the black voltage setting system) may include the display panel 10, a driving circuit 11 including the data driver DDU, a measurement device 20, and a computing device 30. Although the display panel 10 and the driving circuit 11 are mainly described for convenience of explanation, the black voltage setting system may include the display device of FIG. 1.

As shown in FIG. 3, the display panel 10 may include a first pixel PX1 of a first color, a second pixel PX2 of a second color, and a third pixel PX3 of the third color. For example, the display panel 10 may include region A and the first pixel PX1 of the first color, the second pixel PX2 of the second color, and the third pixel PX3 of the third color may be arranged in region A.

The display panel 10 may include a display area DA and a peripheral area PA arranged outside the display area DA. Although the display area DA is shown as having a rectangular shape in FIG. 1, the present disclosure is not limited thereto. The display area DA may have various shapes, such as a circular shape, an oval shape, a polygonal shape, a shape of a specific figure, and the like.

The display area DA is a portion for displaying an image, in which a plurality of pixels PX1, PX2, and PX3 may be arranged. The plurality of pixels PX1, PX2, and PX3 may include a display element such as an OLED. Each of the plurality of pixels PX1, PX2, PX3 may emit, for example, red, green, or blue light. Each of the plurality of pixels PX1, PX2, and PX3 may be connected to a pixel circuit including a thin film transistor (TFT), a storage capacitor, and the like.

Each pixel PX may emit light having a luminance corresponding to an electrical signal from the pixel circuit to which the pixel PX is electrically connected. The display area DA may display a certain image through light emitted from each pixel PX. For reference, each pixel PX may be defined as a light-emitting area that emits light of any one color of red, green, and blue.

The peripheral area PA, in which the pixel PX is not arranged, may be an area that does not display an image. A power supply wiring for driving each pixel PX, and the like, may be arranged in the peripheral area PA. Furthermore, a plurality of pads may be arranged in the peripheral area PA, and a printed circuit board including a driving circuit portion or an integrated circuit element such as a driver IC may be electrically connected to the pads in the peripheral area PA.

For reference, as the display panel 10 includes a substrate 100, it may be said that the substrate 100 includes the display area DA and the peripheral area PA. The substrate 100 is described in detail below.

Furthermore, a plurality of transistors may be arranged in the display area DA. According to the type (e.g., N-type or P-type) of a transistor and the operation conditions, a first terminal of a transistor may be a source terminal or a drain terminal, and a second terminal thereof may be a terminal different from the first terminal. For example, when the first terminal is a source terminal, the second terminal may be a drain terminal.

For example, the transistors may include a driving transistor, a switching transistor, a compensation transistor, an initialization transistor, an emission control transistor, and the like.

The OLED may include a pixel electrode (anode) and an opposite electrode (cathode) and may receive a required voltage from the pixel electrode (anode) and the opposite electrode (cathode). The OLED may receive a driving current from the driving transistor and emit light so as to display an image.

In the present disclosure, the display device 1 or the display panel 10 is used herein as an example to describe the organic light-emitting display technology, but the display device 1 or display panel 10 used herein is not limited thereto. In some embodiments, the display device 1 or display panel 10 may be an inorganic light-emitting display device (or an inorganic EL display device) or a quantum dot light-emitting display device. For example, an emission layer of a display element included in the display device 1 may include an organic material or an inorganic material.

Also, the display device 1 may include an emission layer and quantum dots arranged in a path of light emitted from the emission layer.

As shown in FIGS. 2 and 3, the driving circuit 11 including data driver DDU may provide a test voltage to the display panel 10 and a test image may be displayed on a screen of the display panel 10.

The test voltage may refer to a data voltage applied to the display panel 10 to measure the luminance and color image. The test image may mean a screen displayed on the display panel 10 to which the test voltage is applied.

The measurement device 20 may include a luminance measurement device for measuring the luminance of the display panel 10. For example, the measurement device 20 may measure the luminance of a certain area of the display panel 10. The measurement device 20 may include a color area measurement device for measuring the color area of the display panel 10. For example, the measurement device 20 may measure the color area of a certain area of the display panel 10.

The color area may refer to a color indicator such as CIE 1931. In the present disclosure, measuring the color area may imply obtaining a color coordinate of a target being measured. The color coordinate may refer to an (x, y) coordinate or an (x, y, z) coordinate in a predetermined color indicator such as CIE 1931.

The computing device 30 may control the measurement device 20 and the controller TCU. In addition, the computing device 30 may receive a user input from the user and perform a specific operation based on the user input. To this end, the computing device 30 may include a processor 31, a memory 32, and a data transceiver 33.

The processor 31 may execute the instruction stored in the memory 32 and control other elements.

The processor 31 may execute an operation and may control other devices. The processor 31 may mainly refer to a central processing unit (CPU), an application processor (AP), a graphic processing unit (GPU), etc. In addition, the CPU, AP or GPU may include one or more cores, and the CPU, AP, or GPU may operate by using an operating voltage and a clock signal.

The processor 31 may provide or process appropriate information or functions to the user by processing signals, data, information, etc., input or output by the elements described above or by driving an application program stored in the memory 32.

The memory 32 stores data supporting various functions of the computing device 30. The memory 32 may store a plurality of application programs driven in the computing device 30 and data and instructions for operating the computing device 30.

The memory 32 may include at least one type of storage medium among a flash memory type, a hard disk type, a solid state disk (SSD) type, a silicon disk drive (SDD) type, a multimedia card micro type, a card type memory (for example, an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

A data transceiver 33 may perform wired communication or wireless communication. Wireless communication may be a communication (e.g., 3G, LTE, 5G, 6G, etc.) using telecommunications facilities installed by telecommunications companies and frequency of the telecommunications facilities or may be a short distance communication such as Bluetooth, Bluetooth Low Energy (BLE), Beacon, Radio Frequency Identification (RFID), Near Field Communication (NFC), Infrared Data Association (IrDA), Ultra Wideband (UWB), ZigBee, and the like.

The computing device 30 may control the measurement device 20 and the controller TCU and receive information about the luminance and color area, which are measured result from the measurement device 20. The computing device 30 may individually obtain the black voltage of each of the first pixel PX1 to the third pixel PX3 based on the received luminance and color area. The black voltage may refer to a voltage required for a certain portion of or the entire display to show a black color.

Individually obtaining the black voltage of each of the first to third pixels PX1 to PX3 may imply separately obtaining or deriving each of the black voltage of the first pixel PX1, the black voltage of the second pixel PX2, and the black voltage of the third pixel PX3. Individually obtaining the black voltage of each of the first to third pixels PX1 to PX3 may imply obtaining a black voltage of at least one type of pixel selected from the first pixels PX1 of the first color, the second pixels PX2 of the second color, and the third pixels PX3 of the third color and may mean that the black voltage of unselected other types of pixels may be 0 V or be substituted with a reference voltage.

The computing device 30 may control the measurement device 20 to measure the color area of the display panel 10 when the luminance exceeds a preset reference luminance.

The preset reference luminance may refer to a standard luminance used to define the black in the display panel 10. For example, the preset reference luminance may be 0.001 nit. For example, if the luminance measured through the measurement device 20 is equal to or greater than the reference luminance, it could be understood that the display panel 10 has not implemented the black color. If the luminance measured by the measurement device 20 is less than the reference luminance, it could be understood that the display panel 10 has implemented the black color.

For example, the test voltage may be greater than the reference voltage for the display panel 10 to have a reference luminance. The reference luminance may refer to the preset luminance value as described above. The reference voltage may refer to a black gradation voltage applied to the display panel 10 to generate the reference luminance.

For example, the computing device 30 may obtain main color information of the test image from the color area. The main color information may refer to information of a color mainly displayed on the display panel 10 based on the color coordinate information of the display panel 10 in which the test image is displayed. The main color information may be derived from Equation 1 below.

$$\text{Min. }\{\text{duv(A-Red), duv(A-Green), duv(A-Blue), duv(A-Cyan), duv(A-Magenta), duv(A-Yellow), duv(A-White)}\}, A \quad \text{[Equation 1]}$$

(A is a color coordinate measured by the measurement device 20 at a point (or measurement area) A, duv(A-Color) is the distance between the color coordinate of point (or area) A and a color coordinate corresponding to a certain color, A-Red is the distance between the color coordinate of point A and a color coordinate corresponding to the red color, A-Green is the distance between the color coordinate of point A and a color coordinate corresponding to the green color, A-Blue is the distance between the color coordinate of point A and a color coordinate corresponding to the blue color, A-Cyan is the distance between the color coordinate of point A and a color coordinate corresponding to the cyan color, A-Magenta is the distance between the color coordinate of point A and a color coordinate corresponding to the magenta color, A-Yellow is the distance between the color coordinate of point A and a color coordinate corresponding to the yellow color, A-White is the distance between the color coordinate of point A and a color coordinate corresponding to the white color, and the color coordinate corresponding to a certain color (red, green, blue, cyan, magenta, yellow, white) is a preset coordinate.)

The process of deriving main color information based on Equation 1 is described in detail in FIG. 10 below.

The computing device 30 may obtain information about at least one pixel corresponding to the main color information among the first to third pixels PX1 to PX3.

For example, if the main color information is the first color, the pixel corresponding to the first color may be the first pixel PX1.

For example, if the main color information is the second color, the pixel corresponding to the second color may be the first pixel PX1.

For example, if the main color information is the third color, the pixel corresponding to the third color may be the third pixel PX3.

For example, when the main color information is a first mixed color in which the first color and the second color are mixed, the pixel corresponding to the first mixed color may be the first pixel PX1 and the second pixel PX2.

For example, when the main color information is a second mixed color in which the second color and the third color are mixed, the pixel corresponding to the second mixed color may be the second pixel PX2 and the third pixel PX3.

For example, when the main color information is a third mixed color in which the first color and the third color are mixed, the pixel corresponding to the third mixed color may be the first pixel PX1 and the third pixel PX3.

For example, when the main color information is a color in which the first to third colors are mixed (e.g., a white color), the pixel corresponding to a color in which the first or third colors are mixed may be the first to third pixels PX1 to PX3.

For example, the computing device 30 may apply the test voltage to at least one pixel and remeasure the luminance of the display panel 10 while changing the test voltage.

For example, the computing device 30 may obtain the black voltage of at least one pixel based on a changed test voltage when the remeasured luminance is less than a preset reference luminance. The black voltage may be uniformly applied to the entire pixels, but may be individually applied depending on the type of pixel.

The black voltage applied to the first pixels PX1 showing the first color may be a first black voltage, the black voltage applied to the second pixels PX2 showing the second color may be a second black voltage, and the black voltage applied to the third pixels PX3 showing the third color may be a third black voltage.

For example, the computing device 30 may apply the test voltage to the first pixel PX1 when the main color information is the first color, may remeasure the luminance of the display panel 10 while changing the test voltage, and obtain a first black voltage of the first pixel PX1 based on the changed test voltage when the remeasured luminance is less than or equal to the preset reference luminance.

For example, the computing device 30 may apply the test voltage to the second pixel PX2 when the main color information is the second color, may remeasure the luminance of the display panel 10 while changing the test voltage, and obtain a second black voltage of the second pixel PX2 based on the changed test voltage when the remeasured luminance is less than or equal to the preset reference luminance.

For example, the computing device 30 may apply the test voltage to the third pixel PX3 when the main color information is the third color, may remeasure the luminance of the display panel 10 while changing the test voltage, and obtain a third black voltage of the third pixel PX3 based on the changed test voltage when the remeasured luminance is less than or equal to the preset reference luminance.

For example, the computing device 30 may apply the test voltage to the first pixel PX1 and the second pixel PX2 when the main color information is a first mixed color in which the first color and the second color are mixed, remeasure the luminance of the display panel 10 while changing the test voltage, and obtain a first black voltage of the first pixel PX1 and a second black voltage of the second pixel PX2 based on the changed test voltage when the remeasured luminance is less than or equal to the preset reference luminance.

For example, the computing device 30 may apply the test voltage to the second pixel PX2 and the third pixel PX3 when the main color information is a second mixed color in which the second color and the third color are mixed, remeasure the luminance of the display panel 10 while changing the test voltage, and obtain a second black voltage of the second pixel PX2 and a third black voltage of the third pixel PX3 based on the changed test voltage when the remeasured luminance is less than or equal to the preset reference luminance.

For example, the computing device 30 may apply the test voltage to the first pixel PX1 and the third pixel PX3 when the main color information is a third mixed color in which the first color and the third color are mixed, remeasure the luminance of the display panel 10 while changing the test voltage, and obtain a first black voltage of the first pixel PX1 and a third black voltage of the third pixel PX3 based on the changed test voltage when the remeasured luminance is less than or equal to the preset reference luminance.

For example, the computing device 30 may apply the test voltage to the first pixel PX1 and the third pixel PX3 when the main color information is a mixed color in which the first color, the second color and the third color are mixed, remeasure the luminance of the display panel 10 while changing the test voltage, and obtain a first black voltage of the first pixel PX1, a second black voltage of the second pixel PX2, and a third black voltage of the third pixel PX3 based on the changed test voltage when the remeasured luminance is less than or equal to the preset reference luminance.

The computing device 30 may add a margin value to each of the individually set black voltage to generate a source voltage and input the generated source voltage to the driving circuit 11 to set the black voltage. For example, the computing device 30 may transmit or input information about the generated source voltage to the driving circuit 11 and store information about the source voltage in the memory included in the driving circuit 11. The driving circuit 11 may receive and store the information about the black voltage to set the black voltage.

Hereinafter, a method of setting the black voltage of the display device 10 according to an embodiment is described in detail based on the descriptions above.

For reference, the method of setting the black voltage of the display panel 10 (hereinafter, the method of setting the black voltage), according to an embodiment, may be executed by the computing device 30 or the processor 31 included in the computing device 30.

Figure 4:
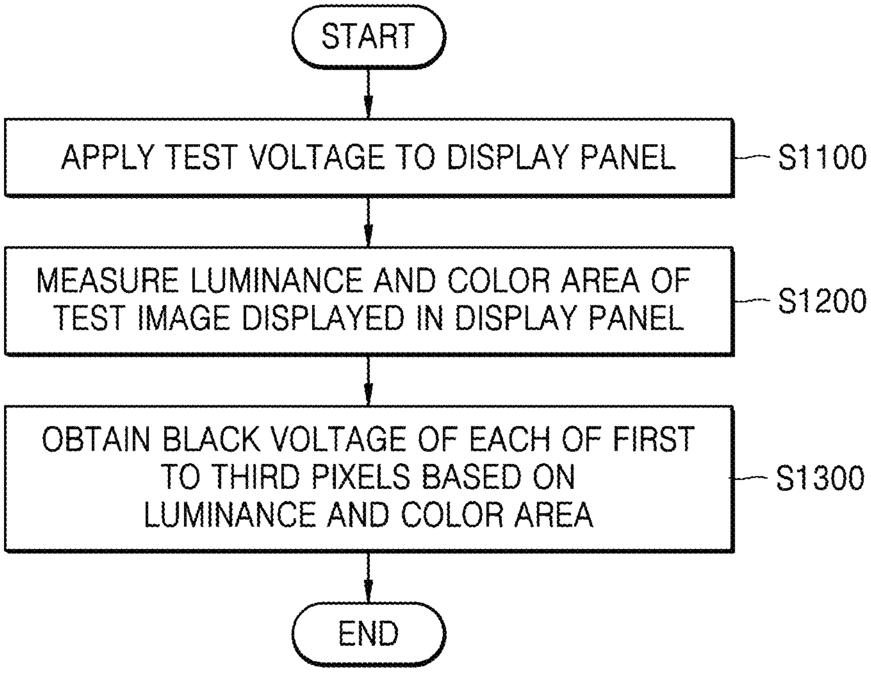
FIG. 4 is a schematic flowchart of a method of setting a black voltage of a display panel, according to an embodiment.

FIG. 4 is a schematic flowchart of a method of setting the black voltage of the display panel 10 according to an embodiment. For reference, the same or duplicate descriptions mentioned above 4 may be omitted.

The method of setting the black voltage may be a method of setting the black voltage of the display panel 10 including the first pixel PX1 of the first color, the second pixel PX2 of the second color, and the third pixel PX3 of the third color. The method of setting the black voltage may include applying the test voltage to the display panel 10 (S1100), measuring the luminance and color area of the test image displayed in the display panel 10 (S1200), and individually obtaining the black voltage of each of the first to third pixels PX1 to PX3 based on the measured luminance and color area (S1300).

In measuring the luminance and color area of the test image (S1200), when the measured luminance exceeds the preset reference luminance, the color area of the display panel 10 may be measured. The measuring of the color area may refer to obtaining the color coordinate value in the color indicator as described above.

The test voltage may be greater than the reference voltage for the display panel 10 to have the reference luminance. The test voltage being greater than the reference voltage may mean that the luminance of the test image displayed by the test voltage is greater than the reference luminance.

FIGS. 5 to 8 are schematic flowcharts illustrating various embodiments of steps for individually obtaining the black voltage of FIG. 4. For reference, the same or duplicate descriptions mentioned above may be omitted.

Figure 5:
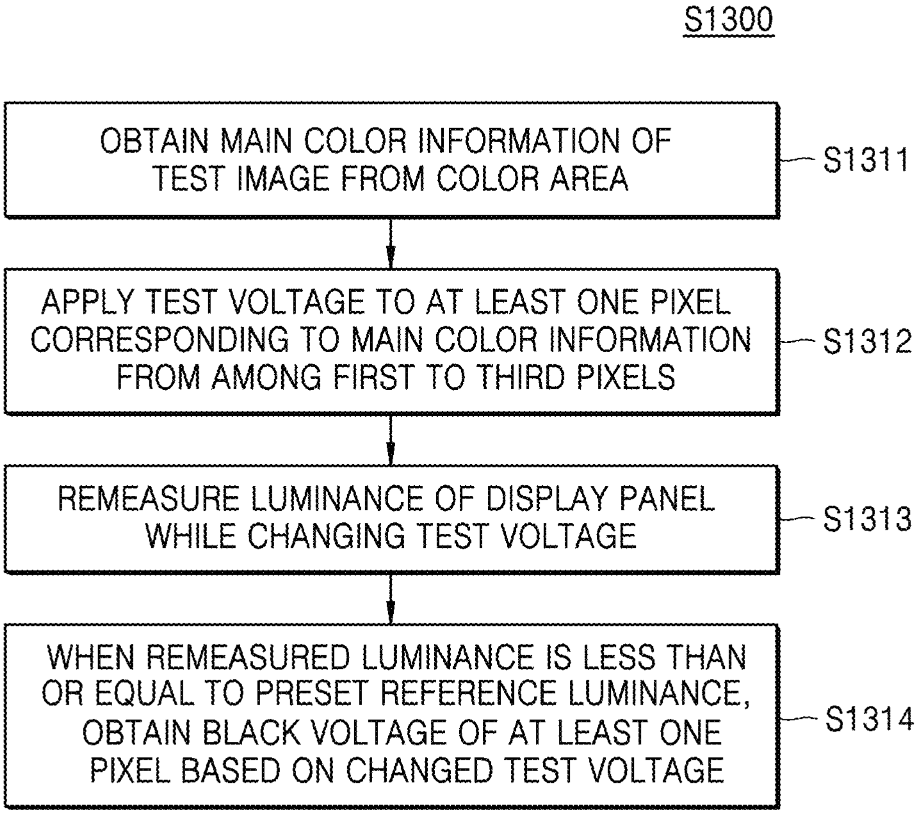
FIGS. 5 to 8 are schematic flowcharts illustrating various embodiments of steps for individually obtaining a black voltage of FIG. 4.

As shown in FIG. 5, the step for obtaining the black voltage individually (S1300) may include obtaining the main color information of the test image from the measured color area (S1311).

The step for obtaining the black voltage individually (S1300) may further include, after obtaining the main color information, obtaining information about at least one pixel of the first to third pixels PX1 to PX3 corresponding to the main color information.

The step for obtaining the black voltage individually (S1300) may further include, after obtaining information about at least one pixel corresponding to the obtained main color information, applying the test voltage to the at least one pixel (S1312) and remeasuring the luminance of the display panel 10 while changing the test voltage (S1313).

The step for obtaining the black voltage individually (S1300) may further include, when the remeasured luminance is less than or equal to the preset reference luminance, obtaining the black voltage of the at least one pixel based on the changed test voltage (S1314).

The main color information may be derived from the color area based on Equation 1 below, and the detailed process of the derivation is described in detail in FIG. 10 below.

Min. {duv(A-Red), duv(A-Green), duv(A-Blue), duv(A-Cyan), duv(A-Magenta), duv(A-Yellow), duv(A-White)}, A [Equation 1]

(A is a color coordinate measured by the measurement device 20 at a point (or measurement area) A, duv(A-Color) is the distance between the color coordinate of point (or area) A and a color coordinate corresponding to a certain color, A-Red is the distance between the color coordinate of point A and a color coordinate corresponding to the red color, A-Green is the distance between the color coordinate of point A and a color coordinate corresponding to the green color, A-Blue is the distance between the color coordinate of point A and a color coordinate corresponding to the blue color, A-Cyan is the distance between the color coordinate of point A and a color coordinate corresponding to the cyan color, A-Magenta is the distance between the color coordinate of point A and a color coordinate corresponding to the magenta color, A-Yellow is the distance between the color coordinate of point A and a color coordinate corresponding to the yellow color, A-White is the distance between the color coordinate of point A and a color coordinate corresponding to the white color, and the color coordinate corresponding to a certain color (red, green, blue, cyan, magenta, yellow, white) is a preset coordinate.)

Figure 6:
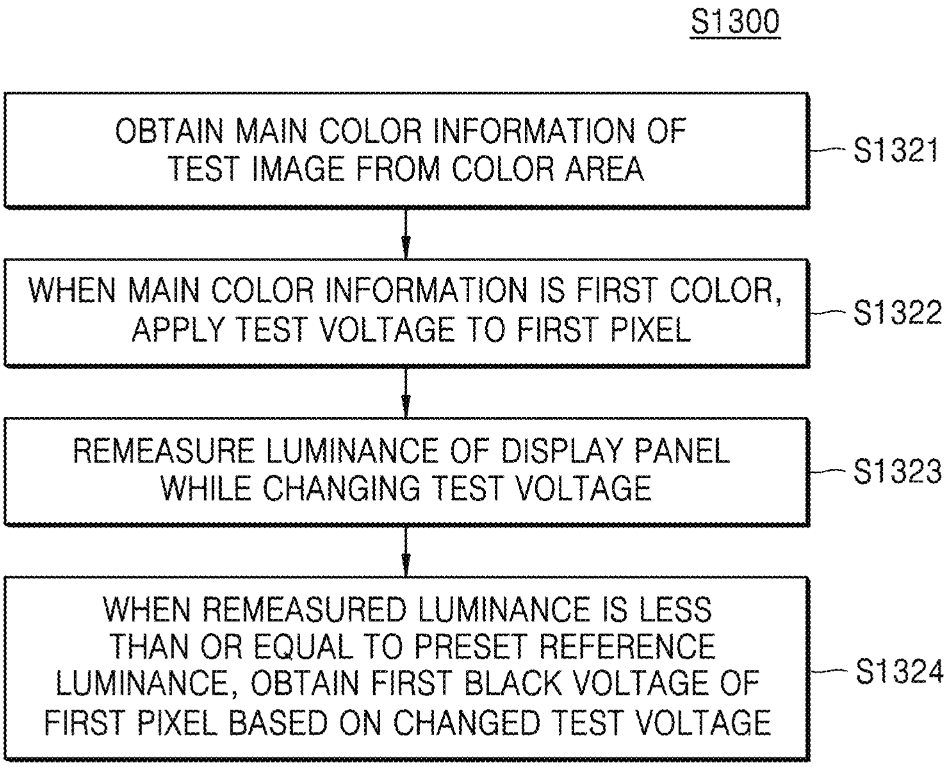

As shown in FIG. 6, the step for obtaining the black voltage individually (S1300) may include obtaining the main color information of the test image from the color area (S1321).

The step for obtaining the black voltage individually (S1300) may include applying the test voltage to the first pixel PX1 when the obtained main color information is the first color (S1322), remeasuring the luminance of the display panel 10 while changing the test voltage (S1323), and obtaining the first black voltage of the first pixel PX1 based on the changed test voltage when the remeasured luminance is less than or equal to the preset reference luminance (S1324).

As a different example from the example shown in FIG. 6, the step for obtaining the black voltage individually (S1300) may include applying the test voltage to the second pixel PX2 when the obtained main color information is the second color, remeasuring the luminance of the display panel 10 while changing the test voltage, and obtaining the second black voltage of the second pixel PX2 based on the changed test voltage when the remeasured luminance is less than or equal to the preset reference luminance.

Figure 7:
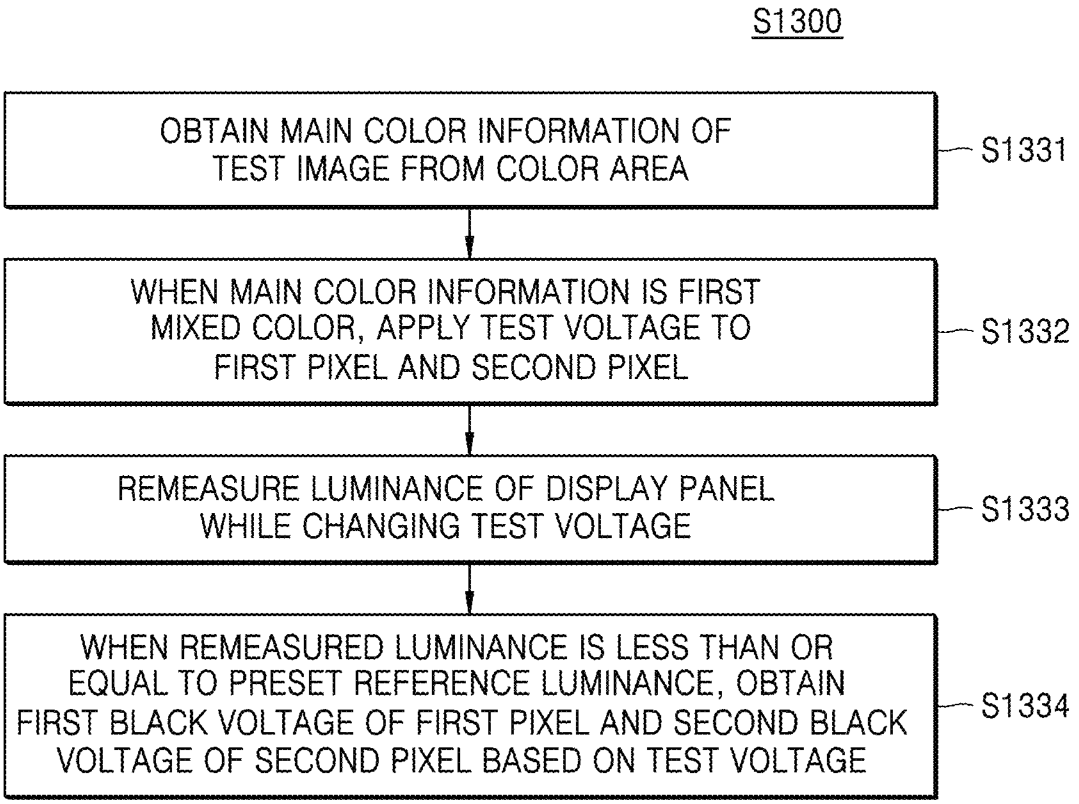

As shown in FIG. 7, the step for obtaining the black voltage individually (S1300) may include obtaining the main color information of the test image from the color area (S1331).

The step for obtaining the black voltage individually (S1300) may include applying the test voltage to the first pixel PX1 and the second pixel PX2 when the obtained main color information is the first mixed color in which the first color and the second color are mixed (S1332), remeasuring the luminance of the display panel 10 while changing the test voltage (S1333), and obtaining the first black voltage of the first pixel PX1 and the second black voltage of the second pixel PX2 based on the changed test voltage when the remeasured luminance is less than or equal to the preset reference luminance (S1334).

As a different example from the example shown in FIG. 7, the step for obtaining the black voltage individually (S1300) may include applying the test voltage to the second pixel PX2 and the third pixel PX3 when the obtained main color information is the second mixed color in which the second color and the third color are mixed, remeasuring the luminance of the display panel 10 while changing the test voltage, and obtaining the second black voltage of the second pixel PX2 and the third black voltage of the third pixel PX3 based on the changed test voltage when the remeasured luminance is less than or equal to the preset reference luminance.

As a different example from the example shown in FIG. 7, the step for obtaining the black voltage individually (S1300) may include applying the test voltage to the first pixel PX1 and the third pixel PX3 when the obtained main color information is the third mixed color in which the first color and the third color are mixed, remeasuring the luminance of the display panel 10 while changing the test voltage, and obtaining the first black voltage of the first pixel PX1 and the third black voltage of the third pixel PX3 based on the changed test voltage when the remeasured luminance is less than or equal to the preset reference luminance.

Figure 8:
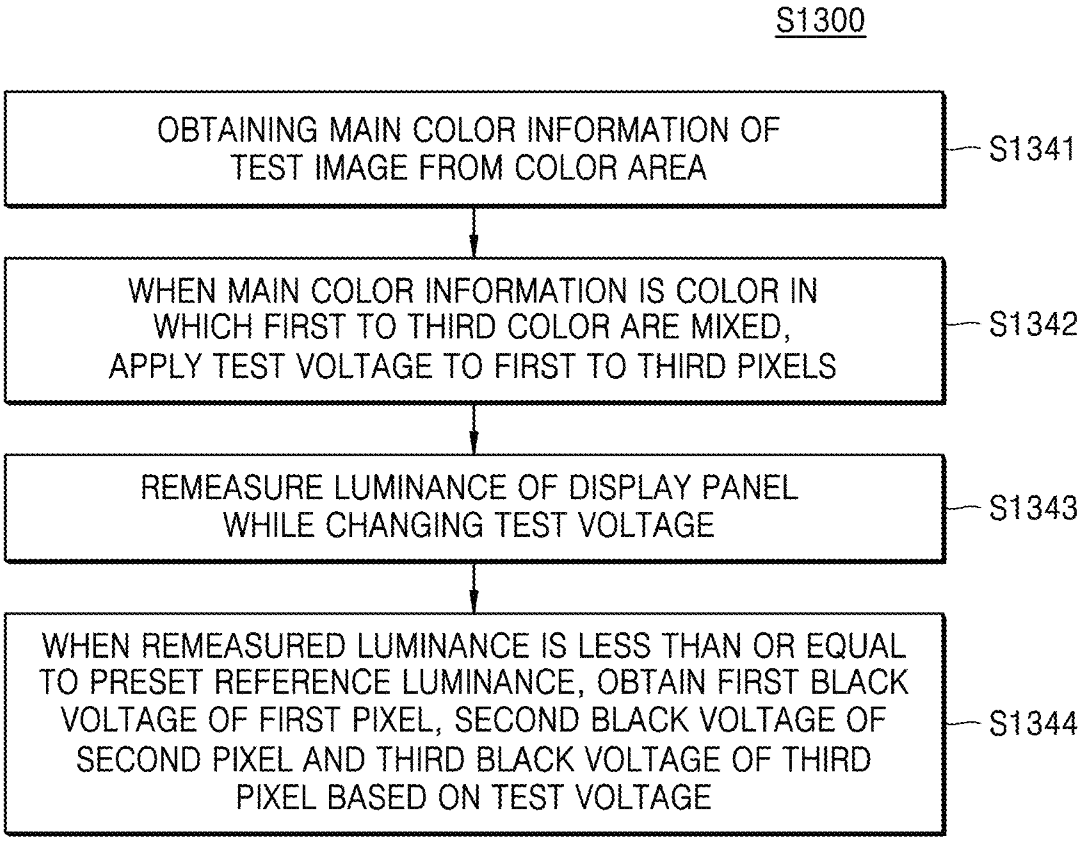

As shown in FIG. 8, the step for obtaining the black voltage individually (S1300) may include obtaining the main color information of the test image from the color area (S1341).

The step for obtaining the black voltage individually (S1300) may include applying the test voltage to the first pixel PX1 and the third pixel PX3 when the obtained main color information is a color in which the first to third colors are mixed (S1342), remeasuring the luminance of the display panel 10 while changing the test voltage (S1343), and obtaining the first black voltage of the first pixel PX1, the second black voltage of second pixel PX2, and the third black voltage of the third pixel PX3 based on the changed test voltage when the remeasured luminance is less than or equal to the preset reference luminance (S1344).

Figure 9:
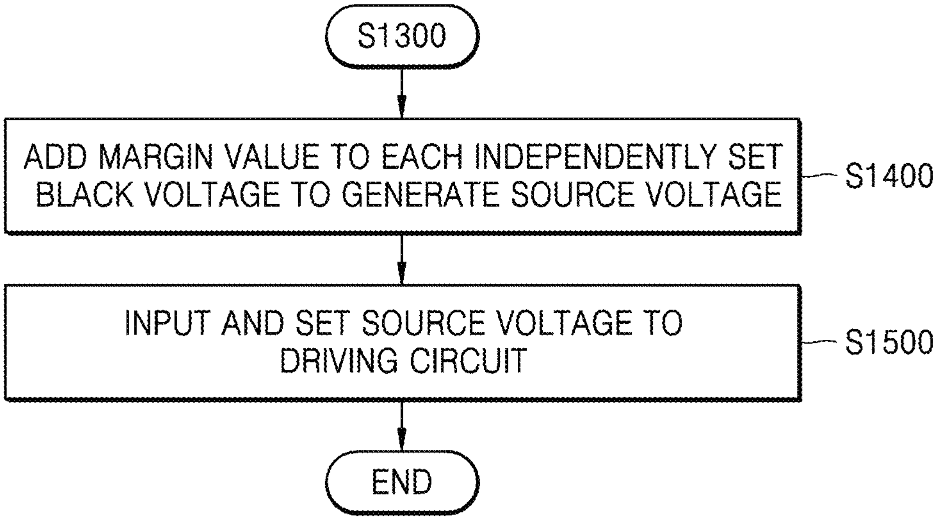
FIG. 9 is a schematic flowchart illustrating steps that are further performed after the step for individually obtaining the black voltage of FIG. 4.

FIG. 9 is a schematic flowchart illustrating steps that are further performed after the step for individually obtaining the black voltage of FIG. 4. For reference, the same or duplicate descriptions mentioned above may be omitted.

As shown in FIG. 9, the method of setting the black voltage may further include generating a source voltage by adding a margin value to each individually set black voltage (S1400) and setting the black voltage by inputting the generated source voltage to the driving circuit 11 (S1500).

The margin value may include a first margin value, which is a voltage value added to the black voltage to generate the black gradation voltage. The first margin value may be an additional voltage value to compensate for variations between pixels for circuit driving or screen driving. For example, the first margin value may be 0.3 V. The black gradation voltage may be obtained by adding the first margin value to the obtained black voltage value.

The margin value may include a second margin value, which is a voltage value added to the black voltage to generate the source voltage. For example, the second margin value may be 0.8 V. The source voltage may be obtained by adding the second margin value to the obtained black voltage value.

Furthermore, the steps shown in FIG. 9 may also be performed additionally after the steps in FIGS. 5 to 8.

Figure 10:
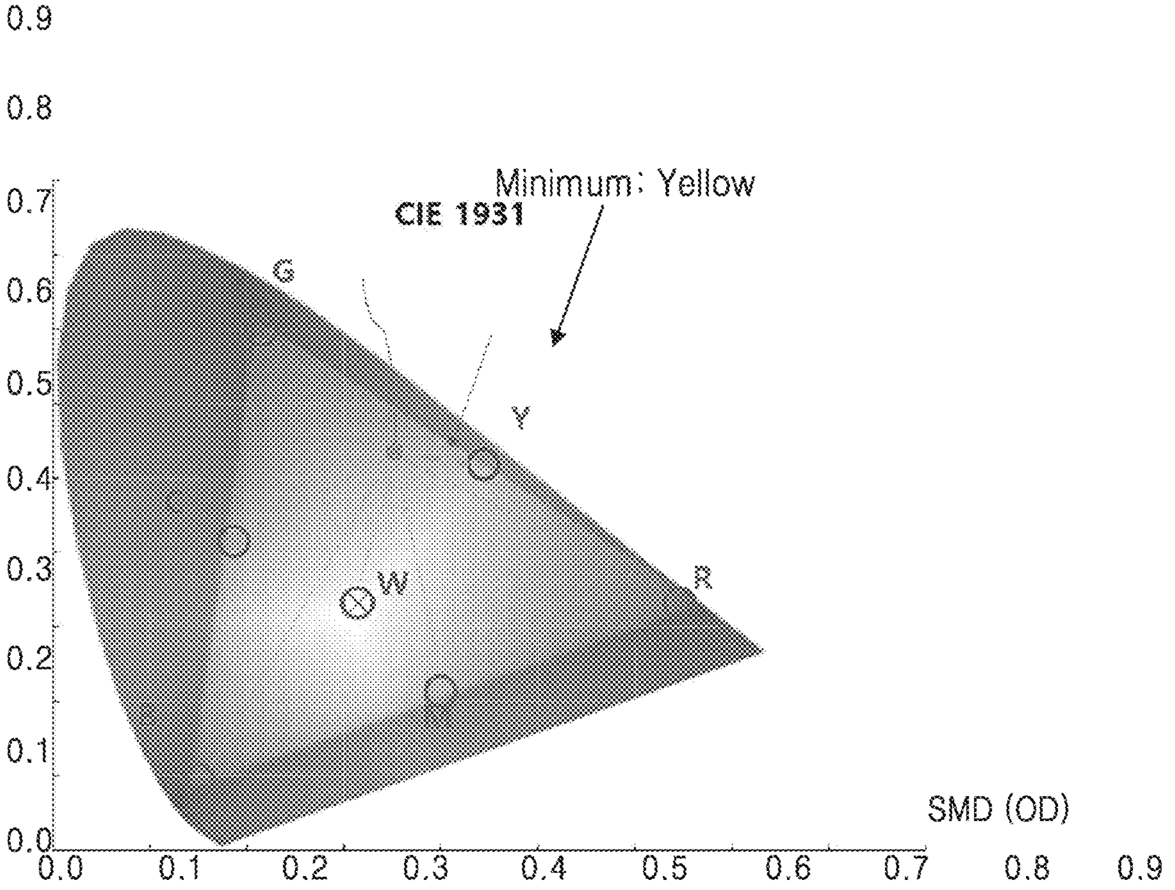
FIG. 10 is an example of deriving main color information through a color area.

FIG. 10 is an example of obtaining the main color information through the color area. For reference, the same or duplicate descriptions mentioned above may be omitted.

As shown in FIG. 10, the color of the pixel in the CIE 1931 color indicator may be shown as coordinates. When measuring the color area, the color coordinate A (x, y) of the color being measured by the measurement device 20 may be one color coordinate included in the color indicator. According to the CIE 1931 color indicator, A (x, y) may be a color coordinate showing a color including all the colors of RGB. Using Equation 1 described above, main color information closest to A (x, y) may be derived, and a black voltage may be obtained based on the main color information.

As shown in FIG. 10, the computing device 30 or the memory of the computing device 30 may store the color coordinate information of a certain color in advance. For example, the computing device 30 or the memory of the computing device 30 may store a red color coordinate, a green color coordinate, a blue coordinate, a cyan color coordinate, a magenta color coordinate, a yellow color coordinate, and a white color coordinate in advance. The computing device 30 may derive the distance between the measured color coordinate A (x, y) and the pre-stored color coordinates for a certain color and obtain information about the color coordinate that is closest to the color coordinate A (x, y). Information about the color coordinate that is closest to the color coordinate A (x, y) may be the main color information described above. Equation 1 described above may be an equation for finding color coordinates closest to the color coordinate A (x, y).

For example, if the color coordinate closest to the color coordinate A (x, y) is a Yellow color coordinate, the main color information may be Yellow. The computing device 30 may apply a test voltage to the pixels corresponding to the red color and the pixels corresponding to the green color, which are colors included in Yellow, and, through the above process, the black voltage applied to the pixels of the red color and the black voltage applied to the pixels of the green color may be derived or obtained.

FIG. 11 is a table comparing the comparative example and the experiment example to demonstrate an effect according to the present disclosure.

Referring to FIG. 11, in the comparative example, the same amount of test voltage may be applied to all pixels when setting the black voltage, and the black voltage may be derived while simultaneously changing the test voltages applied to all the pixels. As a result, the same amount of black voltage may be applied to the pixels of all colors, and the applied black voltage may be confirmed as 5.8 V.

In the experiment example, a red_black voltage of the red pixel, a green_black voltage of the green pixel, and a blue_black voltage of the blue pixel may be set individually. As a result, the derived black voltages may be set differently for each color, and the average of the derived black voltage may be lower than the average black voltage of the comparative example. The amount of power consumed may be reduced as much as the voltage is reduced. The above effect may also be applied to the source voltage.

Figure 12:
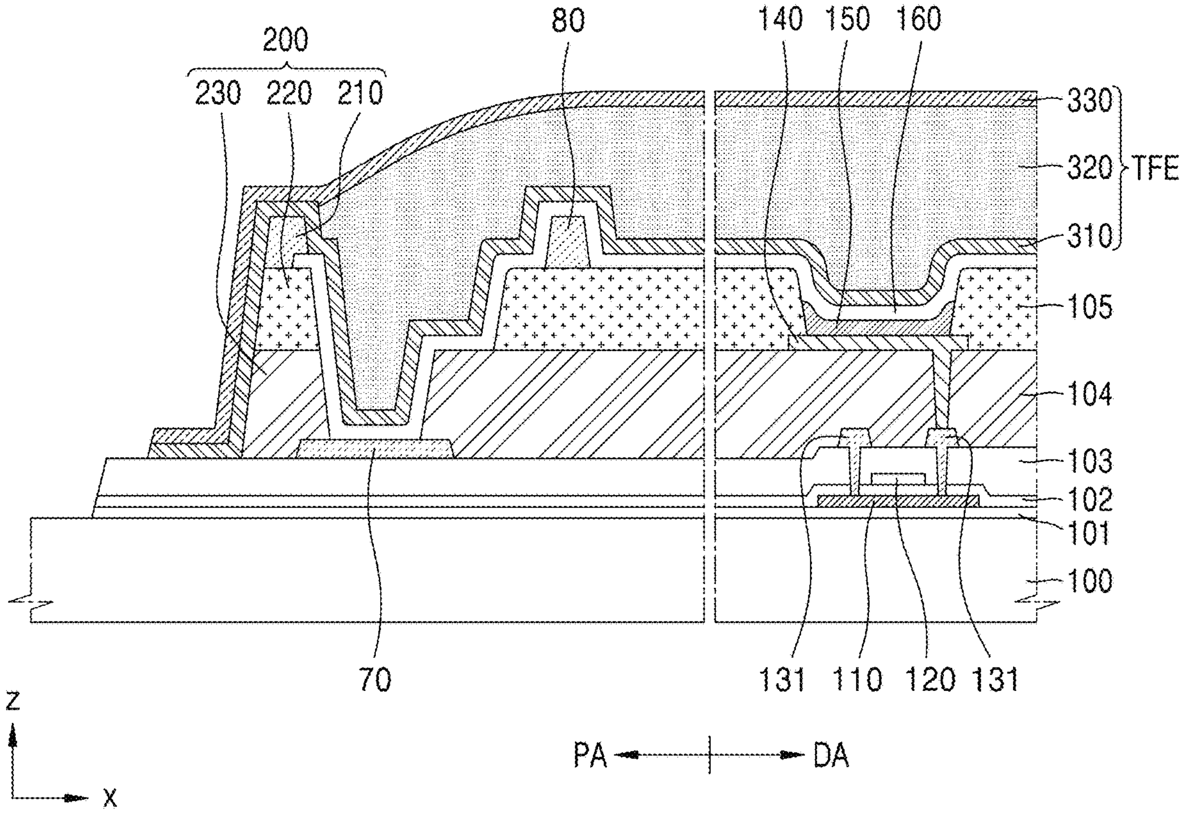
FIG. 12 is a schematic cross-sectional view of a portion of the display device of FIG. 1.

FIG. 12 is a schematic cross-sectional view of a portion of the display device of FIG. 1.

The substrate 100 may include, as described above, the display area DA and the peripheral area PA outside the display area DA. The substrate 100 may include various flexible or bendable materials. For example, the substrate 100 may include glass, metal, or polymer resin. Furthermore, the substrate 100 may include polymer resin, such as polyethersulfone, polyacrylate, polyetherimide, polyethylene naphthalate, polyethylene terephthalate, polyphenylene sulfide, polyarylate, polyimide, polycarbonate, or cellulose acetate propionate. Obviously, various modifications are possible, for example, the substrate 100 may have a multi-layer structure including two layers each including such a polymer resin, and a barrier layer arranged between the layers and including an inorganic material (such as silicon oxide, silicon nitride, or silicon oxynitride).

A buffer layer 101 may be disposed on the substrate 100. The buffer layer 101 may prevent the diffusion of impurity ions or the infiltration of moisture or external air, and may serve as a barrier layer for planarizing a surface, or a blocking layer. The buffer layer 101 may include a silicon oxide, a silicon nitride, or a silicon oxynitride. Furthermore, the buffer layer 101 may control a heat supply speed during a crystallization process for forming a semiconductor layer 110, to uniformly crystalize the semiconductor layer 110.

The semiconductor layer 110 may be disposed on the buffer layer 101. The semiconductor layer 110 may be made of polysilicon, and include a channel region that is not doped with impurities, and a source region and a drain region formed in both sides of the channel region and doped with impurities. The impurities vary depending on the type of the TFT, and may be, for example, N-type impurities or P-type impurities. Although not shown in the drawing, the display device according to the present disclosure may further include another semiconductor layer disposed on another layer.

A gate insulating film 102 may be disposed on the semiconductor layer 110. The gate insulating film 102 may be provided to secure insulation between the semiconductor layer 110 and a gate layer 120. The gate insulating film 102 may include a silicon oxide, a silicon nitride, a silicon oxynitride, or the like, and may be provided between the semiconductor layer 110 and the gate layer 120. Furthermore, the gate insulating film 102 may be formed on the entire surface of the substrate 100, and may have a structure in which contact holes are formed in preset portions. As such, an insulating film including an inorganic material may be formed through chemical vapor deposition (CVD) or atomic layer deposition (ALD). This applies to embodiments and modifications thereof described below in the same manner.

The gate layer 120 may be disposed on the gate insulating film 102. The gate layer 120 may be disposed at a position vertically overlapping the semiconductor layer 110 and may include at least one of a metal of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), titanium (Ti), tungsten (W), and copper (Cu). The gate layer 120 is described below in detail. Although not shown in the drawing, the display device according to the disclosure may further include another gate layer disposed on another layer.

An interlayer insulating film 103 may be disposed on the gate layer 120. The interlayer insulating film 103 may cover the gate layer 120. The interlayer insulating film 103 may include an inorganic material. For example, the interlayer insulating film 103 may include a metal oxide or a metal nitride, and in more detail, the inorganic material may include a silicon oxide ($SiO_2$), a silicon nitride (SiNx), a silicon oxynitride (SiON), an aluminum oxide ($Al_2O_3$), a titanium oxide ($TiO_2$), a tantalum oxide ($Ta_2O_5$), a hafnium oxide ($HfO_2$), a zinc oxide ($ZnO_2$), or the like. In some embodiments, the interlayer insulating film 103 may have a dual structure of SiOx/SiNy or SiNx/SiOy.

A conductive layer 131 may be disposed on the interlayer insulating film 103. The conductive layer 131 may serve as an electrode connected to the source or drain regions of the semiconductor layer 110 via a through-hole formed in the interlayer insulating film 103.

The conductive layer 131 may include one or more metals selected from Al, Pt, Pd, Ag, Mg, Au, Ni, Nd, Ir, Cr, Li, Ca, Mo, Ti, W, and Cu. For example, the conductive layer 131 may include a Ti layer, an Al layer, and/or a Cu layer. For example, the conductive layer 131 may include a Ti/Al/Ti structure.

Although not shown in the drawing, the display device according to the present disclosure may further include another conductive layer disposed on another layer and the other conductive layer may be, for example, a wiring layer that serves as a wiring. Another conductive layer may include the same material or the same layer structure as the conductive layer 131.

An organic insulating layer 104 may be disposed on the conductive layer 131. The organic insulating layer 104 that covers the conductive layer 131 and has an approximately flat upper surface may serve as a planarization film. The organic insulating layer 104 may include an organic material, such as acryl, benzocyclobutene (BCB), hexamethyldisiloxane (HMDSO), or the like. The organic insulating layer 104 may be variously modified into, for example, a single layer, a multilayer, or the like.

Although not shown in the drawing, the display device according to the present disclosure may further include another organic insulating layer disposed on another layer. Another organic insulating layer may be disposed on another conductive layer described above and may cover another conductive layer to serve as a planarization film. Another organic insulating layer may include the same material or the same layer structure as the organic insulating layer 130.

A pixel electrode 140 may be disposed on the organic insulating layer 104. As another example, the pixel electrode 140 may be disposed on the another organic insulating layer described above. However, for the convenience of description, the pixel electrode 140 is assumed to be disposed on the organic insulating layer 104.

The pixel electrode 140 may be connected to the conductive layer 131 via a contact hole formed in the organic insulating layer 104. A display element may be disposed on the pixel electrode 140. An organic light-emitting element OLED may be used as the display element. In other words, the organic light-emitting element OLED may be disposed, for example, on the pixel electrode 140. The pixel electrode 140 may include a transmissive conductive layer including a transmissive conductive oxide, such as ITO, $In_2O_3$, IZO, or the like, or a reflective layer including a metal, such as Al, Ag, or the like. For example, the pixel electrode 140 may have a three-layered structure of ITO/Ag/ITO.

A pixel defining layer 105 may be disposed on the organic insulating layer 104 and may cover an edge of the pixel electrode 140. For example, the pixel defining layer 105 may cover the edge of the pixel electrode 140. The pixel defining layer 105 has an opening corresponding to a pixel and the opening may be formed to expose at least a central portion of the pixel electrode 140. The opening may be defined by the pixel defining layer 105.

The pixel defining layer 105 may include an organic material, such as polyimide, HMDSO, or the like. Furthermore, a spacer 80 may be disposed on the pixel defining layer 105. Although the spacer 80 is illustrated arranged in the peripheral area PA, the spacer 80 may be located in the display area DA. The spacer 80 may prevent damage to the organic light-emitting element OLED caused by the distortion of a mask in a manufacturing process using the mask. The spacer 80 may include an organic insulating material and may be formed in a single layer or multilayer.

An intermediate layer 150 and a counter electrode 160 may be arranged in the opening described above. The intermediate layer 150 may include a low-molecular or high-molecular material, and when the intermediate layer 150 includes a low-molecular material, the intermediate layer 150 may include a hole injection layer, a hole transport layer HTL, an emission layer EML, an electron transport layer, and an electron injection layer. When the intermediate layer 150 includes a polymer material, the intermediate layer 150 may generally have a structure including the HTL and the EML.

The structure of the intermediate layer 150 may not be limited to the above description and may have various structures. For example, at least any one of the layers forming the intermediate layer 150 may be integrally formed with the counter electrode 160. In an embodiment, the intermediate layer 150 may include a layer patterned to correspond to each of the plurality of pixel electrodes 140.

The counter electrode 160 may include a transmissive conductive layer made of a transmissive conductive oxide, such as ITO, $In_2O_3$, IZO, or the like. The pixel electrode 140 may be used as an anode and the counter electrode 160 may be used as a cathode. The above polarities of the electrodes may be reversely applied.

The counter electrode 160 may be arranged in the display area DA and on the entire surface of the display area DA. In other words, the counter electrode 160 is integrally formed to cover a plurality of pixels. The counter electrode 160 may electrically contact a common power supply line 70 arranged in the peripheral area PA. In an embodiment, the counter electrode 160 may extend to a barrier 200.

A thin film encapsulation layer TFE may be arranged to entirely cover the display area DA and extend toward the peripheral area PA to cover at least a part of the peripheral area PA. The thin film encapsulation layer TFE may extend to the outside of the common power supply line 70.

The thin film encapsulation layer TFE may include a first inorganic encapsulation layer 310, a second inorganic encapsulation layer 330, and an organic encapsulation layer 320 provided therebetween. Each of the first inorganic encapsulation layer 310 and the second inorganic encapsulation layer 330 may include one or more inorganic materials selected from $Al_2O_3$, $TiO_2$, $Ta_2O_5$, $HfO_2$, $ZrO_2$, $SiO_2$, SiNx, and SiON. Each of the first inorganic encapsulation layer 310 and the second inorganic encapsulation layer 330 may be a single layer or multilayers including the materials described above. The first inorganic encapsulation layer 310 and the second inorganic encapsulation layer 330 may include the same material, or different materials.

The first inorganic encapsulation layer 310 and the second inorganic encapsulation layer 330 may have different thicknesses. The thickness of the first inorganic encapsulation layer 310 may be greater than the thickness of the second inorganic encapsulation layer 330. As another example, the thickness of the second inorganic encapsulation layer 330 may be greater than the thickness of the first inorganic encapsulation layer 310, or the thicknesses of the first inorganic encapsulation layer 310 and the second inorganic encapsulation layer 330 may be identical to each other.

The organic encapsulation layer 320 may include a monomer-based material or a polymer-based material. Examples of the polymer-based material may include an acrylic resin, an epoxy resin, polyimide, and polyethylene. For example, the organic encapsulation layer 320 may include acrylate.

The barrier 200 may be arranged in the peripheral area PA on the substrate 100. For example, the barrier 200 may include a portion 230 of the organic insulating layer 104, a portion 220 of the pixel defining layer 105, and a portion 210 of the spacer 80, but the present disclosure is not limited thereto. The barrier 200 may include at least one of a portion 230 of the organic insulating layer 104, a portion 220 of the pixel defining layer 105, and a portion 210 of the spacer 80.

The barrier 200 is arranged to surround the display area DA and may prevent the organic encapsulation layer 320 of the thin film encapsulation layer TFE from overflowing to the outside of the substrate 100. Accordingly, the organic encapsulation layer 320 may be in contact with an inner surface of the barrier 200 facing the display area DA. When the organic encapsulation layer 320 is in contact with the inner surface of the barrier 200, the first inorganic encapsulation layer 310 may be located between the organic encapsulation layer 320 and the barrier 200, and the organic encapsulation layer 320 contacts the first inorganic encapsulation layer 310. The first inorganic encapsulation layer 310 and the second inorganic encapsulation layer 330 may be disposed on the barrier 200 and may extend toward an edge of the substrate 100.

In an embodiment, the thin film encapsulation layer TFE may be replaced with a cover member that covers the whole display area DA. The cover member may be arranged to cover at least a portion of the peripheral area PA as well as the display area DA. The cover member may include a rigid member (e.g., glass, etc.). If the thin film encapsulation layer TFE is replaced with the cover member, the barrier 200 described above may be omitted. In some cases, a transparent filler may be arranged between the cover member and the counter electrode 160.

According to the embodiment of the present disclosure described above, the method and system of setting the black voltage of the display panel may be implemented to reduce power consumption by setting the black voltage considering the color area. However, the scope of the disclosure is not limited by these effects.

It should be understood that embodiments described herein should be considered in a descriptive sense only and not for purposes of limitation. Descriptions of features or aspects within each embodiment should typically be considered as available for other similar features or aspects in other embodiments. While the present disclosure has been described with reference to the drawings and embodiments thereof, it will be understood by those of ordinary skill in the art that various changes in form and details may be made thereto without departing from the spirit and scope of the present disclosure as set forth in the following claims.

What is claimed is:

1. A method of setting a black voltage of a display panel comprising a first pixel of a first color, a second pixel of a second color, and a third pixel of a third color, the method comprising: applying a test voltage to the display panel; measuring a luminance and color area of a test image displayed in the display panel; and individually obtaining a black voltage of each of the first to third pixels based on the luminance and the color area; wherein the measuring of the luminance and the color area of the test image comprises, when the luminance exceeds a preset reference luminance, measuring a color area of the display panel.

2. The method of claim 1, wherein the test voltage is greater than a reference voltage for the display panel to have the reference luminance.

3. The method of claim 1, wherein the individually obtaining the black voltage comprises obtaining main color information of the test image from the color area.

4. The method of claim 3, wherein the individually obtaining the black voltage further comprises obtaining information about at least one pixel corresponding to the main color information among the first to third pixels.

5. The method of claim 4, wherein the individually obtaining the black voltage further comprises:

applying the test voltage to the at least one pixel; and remeasuring the luminance of the display panel while changing the test voltage.

6. The method of claim 5, wherein the individually obtaining the black voltage further comprises, when the remeasured luminance is less than or equal to the preset reference luminance, obtaining the black voltage of the at least one pixel based on the changed test voltage.

7. The method of claim 3, wherein the main color information is derived from the color area based on an equation:

$$\text{Min. }\{duv(A\text{-}Red), duv(A\text{-}Green), duv(A\text{-}Blue), duv(A\text{-}Cyan), duv(A\text{-}Magenta), duv(A\text{-}Yellow), duv(A\text{-}White)\}, A,$$

where A is a color coordinate measured by a measurement device at a point A, duv(A-Red) is a distance between the color coordinate of point A and a color coordinate corresponding to red color, duv(A-Green) is a distance between the color coordinate of point A and a color coordinate corresponding to green color, duv(A-Blue) is a distance between the color coordinate of point A and a color coordinate corresponding to blue color, duv(A-Cyan) is a distance between the color coordinate of point A and a color coordinate corresponding to cyan color, duv(A-Magenta) is a distance between the color coordinate of point A and a color coordinate corresponding to magenta color, duv(A-Yellow) is a distance between the color coordinate of point A and a color coordinate corresponding to yellow color, duv(A-White) is a distance between the color coordinate of point A and a color coordinate corresponding to white color, and Min. refers to a minimum value.

8. The method of claim 3, wherein the individually obtaining the black voltage comprises:

applying the test voltage to the first pixel when the main color information is the first color;

remeasuring the luminance of the display panel while changing the test voltage; and when the remeasured luminance is less than or equal to the preset reference luminance, obtaining a first black voltage of the first pixel based on the changed test voltage.

9. The method of claim 3, wherein the individually obtaining the black voltage comprises:

applying the test voltage to the first pixel and the second pixel when the main color information is a first mixed color in which the first color and the second color are mixed;

remeasuring the luminance of the display panel while changing the test voltage; and when the remeasured luminance is less than or equal to the preset reference luminance, obtaining a first black voltage of the first pixel and a second black voltage of the second pixel based on the changed test voltage.

10. A system for setting a black voltage of a display panel, the system comprising: a display panel comprising a first pixel of a first color, a second pixel of a second color, and a third pixel of a third color; a driving circuit connected to the display panel and supplying a test voltage to the display panel; a measurement device disposed on the display panel and measuring a luminance and a color area of a test image displayed in the display panel; and a computing device connected to the driving circuit and the measurement device and controlling the measurement device and the driving circuit and individually obtaining a black voltage of each of the first to third pixel pixels based on the luminance and the color area; wherein the computing device, when the luminance exceeds a preset reference luminance, further controls the measurement device to measure the color area of the display Panel.

11. The system of claim 10, wherein the test voltage is greater than a reference voltage for the display panel to have the reference luminance.

12. The system of claim 10, wherein the computing device further obtains main color information of the test image from the color area.

13. The system of claim 12, wherein the computing device further obtains information about at least one pixel corresponding to the main color information among the first to third pixels.

14. The system of claim 13, wherein the computing device further applies the test voltage to the at least one pixel and remeasures the luminance of the display panel while changing the test voltage.

15. The system of claim 14, wherein the computing device, when the remeasured luminance is less than or equal to the preset reference luminance, further obtains the black voltage of the at least one pixel based on the changed test voltage.

16. The system of claim 12, wherein the main color information is derived from the color area based on an equation:

Min. {duv(A-Red), duv(A-Green), duv(A-Blue), duv (A-Cyan), duv(A-Magenta), duv(A-Yellow), duv(A-White)}, A, where A is a color coordinate measured by the measurement device at a point A, duv(A-Red) is a distance between the color coordinate of point A and a color coordinate corresponding to red color, duv(A-Green) is a distance between the color coordinate of point A and a color coordinate corresponding to green color, duv (A-Blue) is a distance between the color coordinate of point A and a color coordinate corresponding to blue color, duv(A-Cyan) is a distance between the color coordinate of point A and a color coordinate corresponding to cyan color, duv(A-Magenta) is a distance between the color coordinate of point A and a color coordinate corresponding to magenta color, duv(A-Yellow) is a distance between the color coordinate of point A and a color coordinate corresponding to yellow color, duv(A-White) is a distance between the color coordinate of point A and a color coordinate corresponding to white color, and Min. refers to a minimum value.

17. The system of claim 12, wherein the computing device, when the main color information is the first color, further applies the test voltage to the first pixel, remeasures the luminance of the display panel while changing the test voltage, and when the remeasured luminance is less than or equal to the preset reference luminance, obtains a first black voltage of the first pixel based on the changed test voltage.

18. The system of claim 12, wherein the computing device, when the main color information is a first mixed color in which the first color and the second color are mixed, further applies the test voltage to the first pixel and the second pixel, remeasures the luminance of the display panel while changing the test voltage, and when the remeasured luminance is less than or equal to the preset reference luminance, obtains a first black voltage of the first pixel and a second black voltage of the second pixel based on the changed test voltage.

* * * * *